United States Patent [19]
Yogo

[11] Patent Number: 4,549,470
[45] Date of Patent: Oct. 29, 1985

[54] PNEUMATIC ACTUATOR
[75] Inventor: Kenji Yogo, Nagoya, Japan
[73] Assignee: Aisin Seiki Kabushiki Kaisha, Japan
[21] Appl. No.: 626,262
[22] Filed: Jun. 29, 1984
[30] Foreign Application Priority Data
  Jun. 29, 1983 [JP] Japan .................. 58-099449
[51] Int. Cl.[4] .................. F01B 19/00; F16J 3/02
[52] U.S. Cl. .................. 92/94; 92/99; 92/167; 384/215
[58] Field of Search .................. 384/215; 308/4 R; 92/167, 94, 99, 100

[56] References Cited
U.S. PATENT DOCUMENTS

| 373,072 | 11/1887 | Jarvis | 92/167 |
| 889,044 | 5/1908 | Roberts et al. | 92/167 |
| 2,848,283 | 8/1958 | Schroeder | 384/215 |
| 3,485,538 | 12/1969 | Nogle et al. | 384/215 |
| 4,251,050 | 2/1981 | McInerney | 92/167 |
| 4,403,538 | 9/1983 | Rise | 92/167 |

FOREIGN PATENT DOCUMENTS 2709998 9/1978 Fed. Rep. of Germany ...... 384/215
33-7175 2/1958 Japan.

Primary Examiner—Paul E. Maslousky
Attorney, Agent, or Firm—Sughrue, Mion, Zinn, Macpeak and Seas

[57] ABSTRACT

A pneumatic actuator is provided for a gate valve in a turbocharger system to control the bypass of exhaust gasses to regulate the speed of the turbocharger. The actuator includes a reciprocating rod connected at one end to a diaphragm and adapted to be connected at the other end to a pivoted lever for actuating the valve. A bearing is provided for the reciprocating rod with the bearing being moveably supported by a leaf spring arrangement mounted on the actuator for absorbing vibrations and transverse movement of the reciprocating rod.

5 Claims, 2 Drawing Figures

PNEUMATIC ACTUATOR

BACKGROUND OF THE INVENTION

The present invention is directed to a pneumatic actuator for a gate valve for controlling exhaust gasses in a turbocharger, and more specifically to the bearing arrangement for the link mechanism associated with said actuator.

A conventional turbocharger for a vehicle engine is shown in FIG. 1 wherein the turbine 3 is driven by the exhaust gas flow from an exhaust manifold 2 through an exhaust passage 30. After the exhaust gas passes through the turbine 3, the exhaust gas is led to a catalytic converter 4. The turbine 3 drives a compressor 5 through shaft 31 supported in a housing 32 and the impeller of the compressor 5 compresses the air flow from passage 6 for delivery to an intake manifold 1. A gate valve 18 is provided in the passage 30 for diverting the exhaust gas flow from the turbine 3 in order to reduce the compressor speed. The gate valve 18 is moveable between the open and closed positions by means of a lever 17 which is pivoted at 16 with the opposite ends thereof being pivotally connected to the rod 14 of an actuator 9 by means of a pin 15 and the valve 18.

The actuator 9 is provided with a chamber 11 defined by a diaphragm 13 and a port 10 which communicates the chamber 11 with a passage 8 which is in communication with a port 7 in the passage 33 leading from the compressor 5 to the intake manifold 1. The diaphragm 13 is biased to the right, as viewed in FIG. 1, by means of a coil spring 12.

In such turbocharger systems, at higher engine speeds the exhaust gas flow is substantially increased so that the turbine 3 and compressor 5 will be driven at higher speeds. As a result, an excessive amount of compressed air is delivered to the intake manifold 1. As the air pressure in the passage 33 leading to the intake manifold 1 increases, the air pressure supplied to the chamber 11 of the actuator 9 through the passage 8 also increases. When the air pressure in the chamber 11 becomes larger than the biasing force of the spring 12, the diaphragm 13 will be moved to the left, as viewed in FIG. 1, and the rod 14 will be shifted to the left. The leftward movement of the rod 14 causes the lever 17 to rotate counterclockwise, as viewed in FIG. 1, and the gate valve 18 will be opened to permit the exhaust gas to bypass the turbine 3 to thereby decrease the rate of rotation of the compressor 5 to prevent overpressurization in the passage 33. Due to the pivoting action of the lever 17, the rod 14, which is pivotally connected to one end of the lever 17, does not reciprocate in a straight line, and, as a result, it is very difficult to provide a bearing in the actuator 9 for the rod 14. Therefore, vibrations transmitted from the engine and road are delivered to the diaphragm 13 through the rod 14, thereby adversely affecting the durability of the diaphragm 13.

SUMMARY OF THE INVENTION

The present invention provides a new and improved pneumatic actuator which eliminates the disadvantages discussed above with respect to the prior art actuators for turbocharger control systems.

The present invention provides a new and improved pneumatic actuator for a turbocharger control system which includes a bypass passage for exhaust gasses and a gate valve for controlling the flow of exhaust gasses wherein said actuator includes a diaphragm dividing the interior of the actuator into a first chamber communicating with a passage leading from a turbocharger compressor to the intake manifold and a second chamber communicating constantly with the atmosphere, linkage means operably connecting said diaphragm to said gate valve, said linkage means including a rod connected at one end to said diaphragm with the opposite end extending outwardly of the actuator through an aperture, coil spring means disposed in said second chamber for normally biasing said diaphragm in a direction to move said gate valve toward a closed position, bearing means disposed about said rod and leaf spring means supporting said bearing means in said actuator adjacent said aperture whereby said bearing means are moveably supported relative to said actuator to accomodate non-linear movement of said rod.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
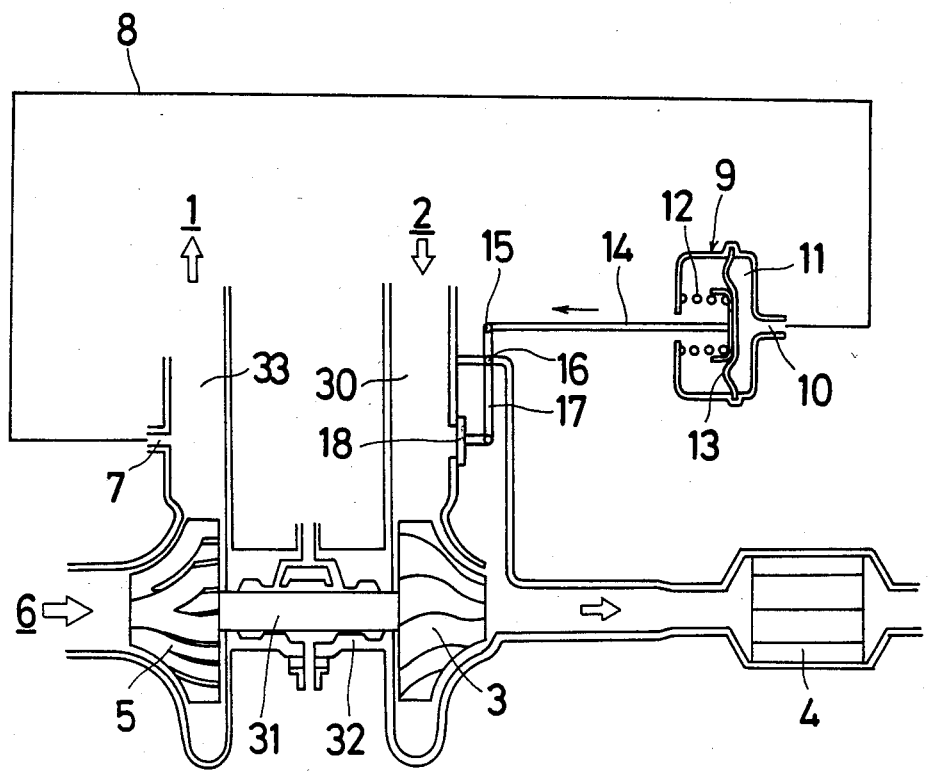
FIG. 1 is a schematic cross sectional view of a prior art turbocharger control system having a bypass valve controlled by a prior art pneumatic actuator.
Figure 2:
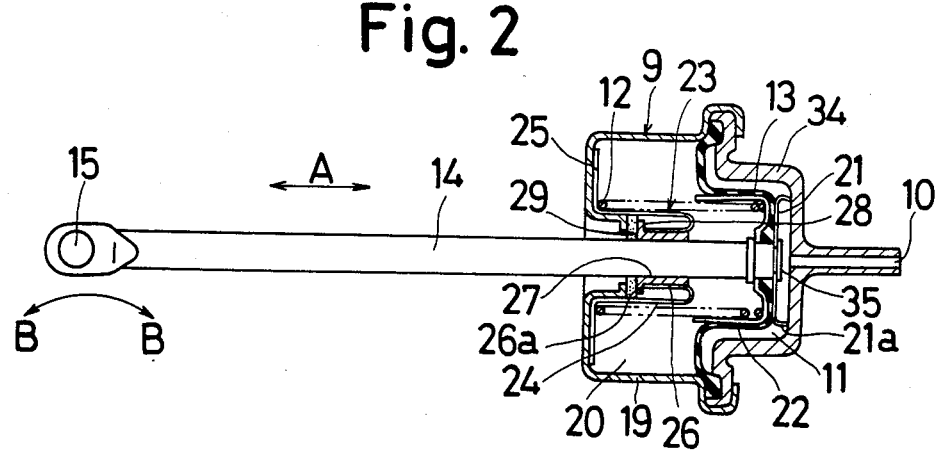
FIG. 2 is a cross sectional view of a pneumatic actuator according to the present invention.

The pneumatic actuator 9 according to the present invention, as shown in FIG. 2, includes a first housing member 34 and a second housing member 19 which are connected together in any convenient manner to define a hollow interior. The hollow interior of the actuator 9 is divided into a first chamber 11 and a second chamber 20 by means of a diaphragm 13 which is fabricated from rubber or any other suitable flexible material. The first chamber 11 is adapted to communicate with the passage 8, shown in the system of FIG. 1, through the port 10 which is formed in the first housing member 34. Therefore, the first chamber 11 is adapted to be maintained in communication with the compressed air passage 33 leading to the intake manifold.

The perforated diaphragm 13 is rigidly secured between the first housing member 34 and the second housing member 19. A coil spring 12 is axially located within the second chamber 20 which is maintained in constant communication with atmospheric pressure. One end of the spring 12 engages the second housing member 19, while the other end of the spring 12 biases the diaphragm 13 to the right, as viewed in FIG. 2. The inner circumferential portion of the diaphragm 13 is supported between a retainer 22, which is interposed between the spring 12 and the diaphragm 13, and a stopper 21 which is secured to the end of a rod 14 by means of a securing member 35. The stopper 21 is provided with a projecting end portion 21a engageable with the first housing member 34 to limit the rightward movement of the diaphragm 13, as viewed in FIG. 2. The rod 14 is provided with a connecting portion 15 which is adapted to be connected to the lever 17, as shown in the arrangement of FIG. 1.

A plurality of leaf springs 23 are located within the second chamber 20. Each leaf spring 23 is provided with an outer axially directed portion 24 which is reversely bent at one end thereof to form an inner axially directed portion 26. The opposite end of each leaf spring is bent radially outwardly to form a flange portion 25. The flange portion 25 is engaged by the coil spring 12 and is normally biased to the left as viewed in FIG. 2 against the inner end wall of the second chamber 20. An annular bearing 27 is inserted into the inner portion 26 of each leaf spring and the rod 14 is slidably mounted within the annular bearing 27. The bearing 27 is provided with an annular flange portion 28 which is engaged by the end portion 26a of the inner axially directed portion 26 of each leaf spring to axially locate the bearing 27. An annular air filter 29 is placed between the flange portion 28 of the bearing 27 and the housing member 19.

The plurality of leaf springs 26 may be secured together to facilitate the assembly of the pneumatic actuator. It is also conceivable that a leaf spring member could be in the form of an annular sleeve having one end portion cut and bent radially outwardly and the other end cut and reversely bent inwardly to support the bearing member.

In operation, when the rotational speed of the turbine 3 increases and the air pressure being supplied from the compressor 5 to the intake manifold 1 increases, the air pressure in the first chamber 11, which is maintained in communication with the intake manifold 1 through the passage 8, will also increase. When the air pressure in the first chamber 11 rises above a predetermined value, which is defined by the biasing force of the coil spring 12, the diaphragm 13 will be pushed to the left, as viewed in FIG. 2. The rod 14, which is connected to the diaphragm 13, will also be moved to the left, and the bypass valve 18 will be moved to the open position so that the exhaust gasses in the passage 30 will bypass the turbine 3 so as to prevent a further increase in the turbine speed. Since the compressor 5 is connected directly to the turbine 3, the pressure in the passage 33 leading to the intake manifold will also be reduced, thereby preventing excessive pressure from being supplied to the intake manifold 1.

With respect to the actuator, the leftward movement of the rod 14 will cause a downward movement of the left end of the rod 14 due to the pivotal connection of the left end of the rod 14 with the pivoted lever 17. The downward movement of rod 14 is absorbed by the leaf springs 23 so that the rod 14 can move smoothly through the bearing 27 to prevent the diaphragm 13 from being damaged by the uncontrolled movement of the rod 14 or by vibrations being transmitted thereto through an unsupported rod.

While the invention has been particularly shown and described with reference to a preferred embodiment thereof, it will be understood by those in the art that various changes in form and details may be made therein without departing from the spirit and scope of the invention.

What is claimed is:

1. A pneumatic actuator comprising hollow housing means, diaphragm means dividing said housing means into first and second chambers, a port formed in said housing means in communication with said first chamber, an aperture formed in said housing member in communication with said second chamber, coil spring means disposed in said second chamber for biasing said diaphragm towards said first chamber, rod means connected to said diaphragm and extending outwardly through said aperture, bearing means for supporting said rod for reciprocating movement relative thereto and leaf spring means mounted in said second chamber for moveably supporting said bearing means adjacent said aperture, said leaf spring means having a reversely bent portion for supporting an outer surface of said bearing means and a flange portion interposed between said coil spring means and said housing means to hold said leaf spring means adjacent an inner wall of said housing means.

2. A pneumatic actuator as set forth in claim 1 wherein said bearing means is provided with a flange portion disposed in engagement with an end portion of said reversely bent portion for properly positioning said bearing means.

3. A pneumatic actuator as set forth in claim 2 further comprising stopper means fixedly secured to said rod for connecting said rod to said diaphragm.

4. A pneumatic actuator as set forth in claim 3 wherein said stopper means includes a projecting end portion located in said first chamber for limiting movement of said diaphragm towards said first chamber.

5. A pneumatic actoator as set forth in claim 4 further comprising filter means interposed between said bearing means and said housing means.

* * * * *